United States Patent [19]

Moser et al.

[11] Patent Number: 5,486,342
[45] Date of Patent: Jan. 23, 1996

[54] CLEAR LIQUOR SCRUBBING OF SULFUR DIOXIDE WITH FORCED OXIDATION IN FLUE GAS DESULFURIZATION SYSTEM

[75] Inventors: Robert E. Moser, Palo Alto; David R. Owens, Mountain View, both of Calif.; James H. Wilhelm, Sandy, Utah; Miriam Stohs, Austin, Tex.; James D. Colley, Anchorage, Ky.; Oliver W. Hargrove, Jr., Austin, Tex.

[73] Assignee: Electric Power Research Institute, Palo Alto, Calif.

[21] Appl. No.: 258,921

[22] Filed: Jun. 13, 1994

[51] Int. Cl.⁶ ............................................. B01D 53/50
[52] U.S. Cl. .................. 423/243.01; 423/243.05; 423/243.08; 423/243.12
[58] Field of Search ................ 423/242.1, 243.01, 423/243.05, 243.08, 243.11, 243.12

[56] References Cited

U.S. PATENT DOCUMENTS

| | | | |
|---|---|---|---|
| 3,873,532 | 3/1975 | Dahlstrom et al. | 423/242 |
| 3,919,394 | 11/1975 | Selmeczi | 423/242 |
| 4,080,428 | 3/1978 | Hölter et al. | 423/242 |
| 4,147,755 | 4/1979 | Gogineni et al. | 423/242 |
| 4,213,946 | 7/1980 | Furuta et al. | 423/242 |
| 4,222,993 | 9/1980 | Hölter et al. | 423/243 |
| 4,231,995 | 11/1980 | Campbell et al. | 423/242 |
| 4,976,936 | 12/1990 | Rathi et al. | 423/242 |
| 5,260,045 | 11/1993 | Moser et al. | 423/243.09 |

FOREIGN PATENT DOCUMENTS

| | | | |
|---|---|---|---|
| 2814644 | 10/1978 | Germany | 423/243.08 |
| 54-46176 | 4/1979 | Japan | 423/243.05 |

Primary Examiner—Ferris Lander
Assistant Examiner—Timothy C. Vanoy
Attorney, Agent, or Firm—Sixbey, Friedman, Leedom & Ferguson

[57] ABSTRACT

A flue gas desulfurization process and system employing a clear scrubbing liquor and an organic acid buffer conducted under forced oxidation conditions to produce a usable gypsum by-product without scrubber scaling and abrasion is provided. Calcium ion concentration and chloride concentration are suppressed to improve limestone utilization, reduce the consumption of organic acids and improve crystal growth. The FGD system includes a limestone reactor for precipitating gypsum separate from the scrubber system which allows the recovery of pure carbon dioxide and a clarifier/softener tank which allows the production of gypsum-free clear scrubbing liquor and a drier gypsum filter cake.

6 Claims, 1 Drawing Sheet

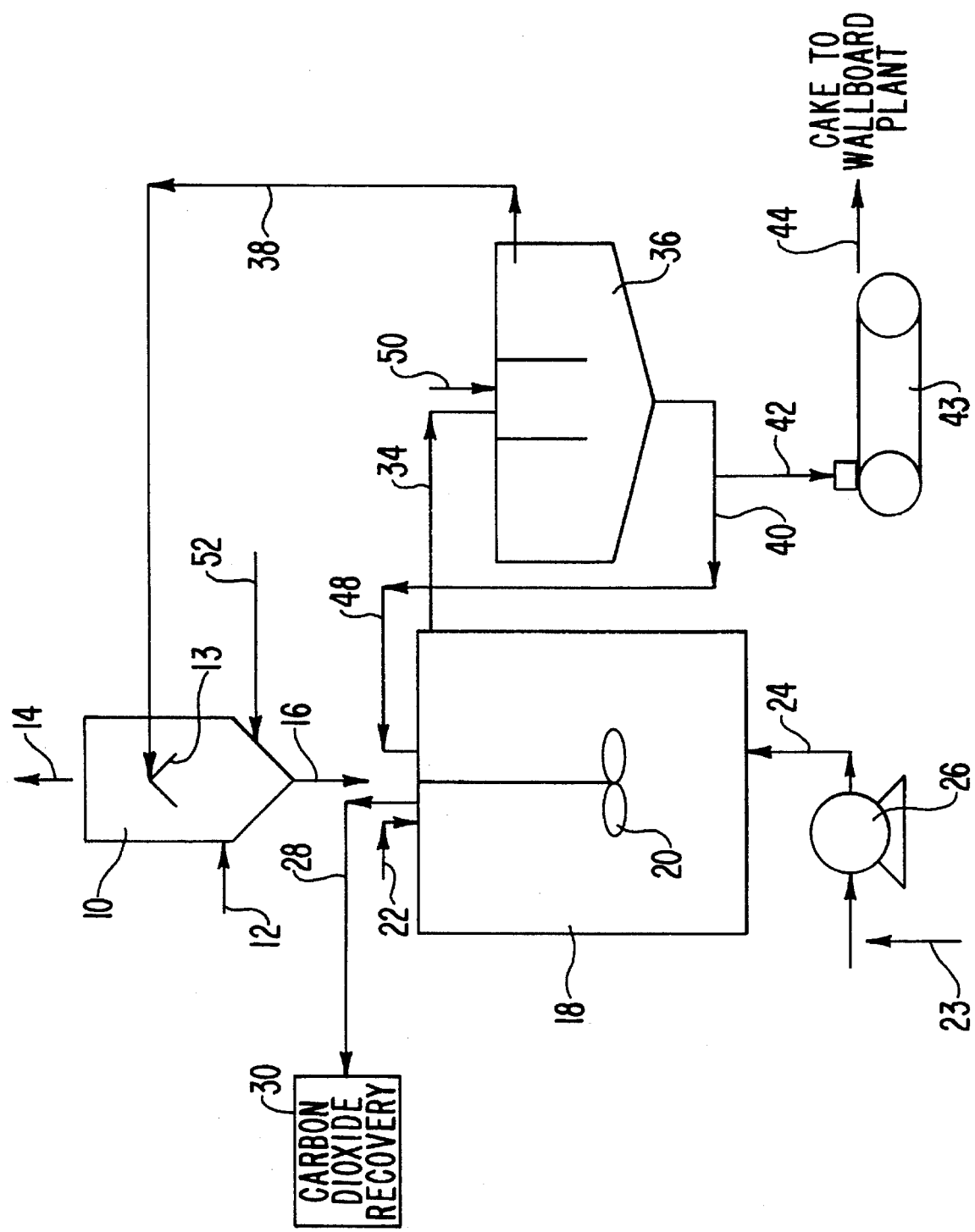

CLEAR LIQUOR SCRUBBING OF SULFUR DIOXIDE WITH FORCED OXIDATION IN FLUE GAS DESULFURIZATION SYSTEM

TECHNICAL FIELD

The present invention relates generally to wet flue gas desulfurization systems and processes and specifically to a wet flue gas desulfurization system and process which employs a buffered clear scrubbing liquor in conjunction with forced oxidation to scrub sulfur oxides from the flue gas.

BACKGROUND OF THE INVENTION

Sulfur oxides are generally removed from electric power-producing combustion systems in a flue gas desulfurization (FGD) system which scrubs the sulfur oxides, primarily sulfur dioxide, with a limestone slurry. This type of process produces gypsum ($CaSO_4.2H_2O$—calcium sulfate dihydrate) for sale or disposal. The scrubbing slurry contains lime or limestone, which is reacted with absorbed sulfur dioxide and oxygen to produce the gypsum. However, these processes can be unreliable because of the presence of suspended solids in the scrubbing solution. The suspended solids can form deposits of solids or scale on the scrubber and other FGD system equipment and also cause abrasion and erosion of the equipment. In addition, high liquid to gas ratios are required due to the limitations of the liquid phase buffering capacity. Also, the addition of packing to the absorber, which would make the scrubbing process more efficient, is not recommended in slurry-based FGD processes due to the potential for the packing to become plugged by the suspended solids and scale formation. The cost of the scrubbing system could be reduced if the plugging, scale formation and equipment abrasion problems could be eliminated. Moreover, cost savings could also be achieved by increasing the alkalinity of the FGD system recirculating liquor so that a lower liquid to gas ratio could be used.

The recirculation of a clear liquor in the scrubbers of FGD systems has been proposed to eliminate the problems accompanying the use of suspended solid slurries and low liquid phase alkalinity in the scrubbers. When an FGD process recirculates clear liquor, the lime or limestone required to scrub the sulfur dioxide is added to the system in a reactor separate from the liquid/gas contactor. One illustrative process, which is widely used, is a dual alkali process, which employs a sodium sulfite clear liquor scrubbing solution. The inventors of the present invention have developed another clear liquor scrubbing system that uses organic acids to provide the required alkalinity under inhibited oxidation conditions. This process is described in U.S. patent application Ser. No. 08/109,487 filed on Aug. 20, 1993, owned by the assignee of the present invention. In all of the known clear liquor scrubbing processes that use lime or limestone for regeneration, a clear scrubbing solution is recirculated in the absorber or scrubber, and a stream of spent liquor is sent to an external reactor for regeneration. Lime or limestone is mixed with this stream to precipitate the absorbed sulfur dioxide. The precipitated solids are separated from the liquor, and the clarified liquor is returned to the absorber to remove more sulfur dioxide frown the flue gas.

U.S. Pat. Nos. 4,080,428 and 4,222,993 to Holter et al. describe flue gas desulfurization processes which employ a clear scrubbing or wash liquor and use organic acids to provide the required alkalinity. Both of these processes require elevated calcium ion concentrations, however, which can adversely affect the FGD process. Further, the limestone reaction rate is reduced so that poor limestone utilization results. Holter et al. U.S. Pat. No. 4,222,993, moreover, defines process parameters, most notably the high pH range, which can only be achieved with lime, which is more expensive than limestone.

While these clear liquor scrubbing systems are effective in sulfur dioxide removal, most of them produce a waste stream of calcium sulfite, which has little, if any, use as a by-product and must therefore be disposed of. Gypsum ($CaSO_4.2H_2O$), which has value for producing wallboard, for cement production and as an agricultural soil additive, is the preferred FGD process by-product.

U.S. Pat. No. 4,213,946 to Furuta et al. addresses one of the disadvantages of producing a gypsum by-product in a flue gas desulfurization process. This patent discloses the use of high concentrations of calcium chloride at low calcium hydroxide concentrations to prevent gypsum scale formation. The high calcium concentrations of up to 40% by weight disclosed by Furuta et al., however, are detrimental to scrubber performance in a clear liquor, organic acid-buffered FGD process, since calcium sulfate scale is more likely to be formed in the scrubber at such high calcium concentrations. Further, the FGD process taught by Furuta et al. uses the more expensive alkali calcium hydroxide rather than the less expensive limestone ($CaCO_3$).

The available clear liquor scrubbing FGD processes, including those described in the Holter et al. patents, produce calcium sulfite. The calcium sulfite can be oxidized to gypsum; however, the production of gypsum in a clear liquor scrubbing process is accompanied by some drawbacks. Gypsum can be produced by oxidizing the calcium sulfite waste stream from the FGD process. This requires lowering the pH of the slurry, usually with sulfuric acid, and oxidizing the calcium sulfite to gypsum by forcing air through the resulting slurry in a relatively tall mixing reactor or column. Because a separate reactor step and additional reagents (sulfuric acid and compressed air) are required, the costs of the FGD system are increased.

Calcium sulfite may also be oxidized in a clear liquor FGD system by forcing air into the bottom of the scrubber or reaction tank as is done in a slurry FGD system. However, in a clear liquor scrubbing system, either the alkalinity of the liquor is lost and/or the scaling potential for gypsum in the scrubber is increased. Low scrubbing pHs are therefore required to maintain the calcium sulfite in solution until it is oxidized. These low scrubbing pHs reduce scrubbing efficiency and may result in high vapor losses and degradation of the organic acid buffer used in clear liquor scrubbing systems. Formate buffers, especially, are adversely affected. Because the low scrubbing pH lowers scrubbing efficiency, high liquid to gas ratios are required to maintain effective scrubbing.

The prior art, therefore, has failed to provide a clear liquor scrubbing, organic acid buffered flue gas desulfurization system or process conducted under forced oxidation conditions which effectively and efficiently scrubs sulfur dioxide from flue gases to produce a usable gypsum by-product without scaling the FGD system components. A need exists for such a system and process.

SUMMARY OF THE INVENTION

It is a primary object of the present invention, therefore, to overcome the disadvantages of the prior art and to provide a clear liquor scrubbing, organic acid buffered flue gas desulfurization system and process conducted under forced oxidation conditions.

It is another object of the present invention to provide a flue gas desulfurization system for conducting a clear liquor scrubbing, organic acid buffered flue gas desulfurization process which produces a usable gypsum by-product.

It is a further object of the present invention to provide a clear liquor scrubbing, organic acid buffered flue gas desulfurization system which avoids scaling and minimizes abrasion and deposition of solids on the system components.

It is still another object of the present invention to provide a clear liquor scrubbing, organic acid buffered flue gas desulfurization system which allows the use of a scrubber with packing to improve efficiency.

It is still a further object of the present invention to provide a clear liquor, organic acid buffered flue gas desulfurization process characterized by improved limestone utilization and improved crystal growth.

The aforesaid objects are achieved by providing a flue gas desulfurization system wherein a flue gas desulfurization process is conducted under forced oxidation conditions to scrub sulfur dioxide from flue gas with a clear scrubbing liquor in the presence of an organic acid buffer to produce gypsum as a by-product without producing scale on system components. Scaling in the absorber is avoided by adding a soluble cation, preferably sodium or magnesium, to the process liquor or by reducing the chloride concentration in the process liquor to minimize the chloride concentration, the effects of which are to suppress the soluble calcium ion concentration. The gypsum by-product is produced under forced oxidation of the scrubber effluent in a reactor separate the scrubber and clarified in a separate clarification stage.

Other objects and advantages will be apparent from the following description, claims and drawings.

BRIEF DESCRIPTION OF THE DRAWINGS

The sole FIGURE is a schematic representation of a flue gas desulfurization system and process flow diagram employing clear liquor scrubbing with organic acids to produce gypsum under forced oxidation conditions in accordance with the present invention.

DESCRIPTION OF THE PREFERRED EMBODIMENTS

The present invention is directed to a flue gas desulfurization system and process which employs a clear scrubbing liquor and an organic acid buffer in the scrubber or absorber to remove sulfur dioxide from flue gas under forced oxidization conditions to produce a gypsum by-product that can be used for wallboard, cement or as an agricultural soil additive. A unique feature of the present process is the ability to produce usable gypsum while avoiding scaling in the scrubber. This is achieved by using a chemistry that differs significantly from that used by other clear liquor scrubbing, organic acid-buffered flue gas desulfurization processes. In distinct contrast to prior art processes, most notably those disclosed by Holter et al. in U.S. Pat. Nos. 4,080,428 and 4,222,993, the present process suppresses the calcium ion concentration in the clear scrubbing liquor. The Holter et al. processes teach increasing the calcium ion concentration. The inventors of the present invention have found that the prior art practice of building up the calcium ion concentration in a clear liquor flue gas desulfurization process results in poor limestone utilization. Suppression of the calcium ion concentration, on the other hand, reduces the consumption of organic acids, improves limestone utilization and improves gypsum crystal growth.

Referring to the drawings, the sole FIGURE illustrates one possible embodiment of the clear liquor, organic acid buffer wet flue gas desulfurization system and process according to the present invention. Other process configurations are also possible within the scope of the present invention, however.

Flue gas from a combustion process such as that used to generate electric power is directed to a wet scrubber 10 at arrow 12. Clear liquor, which is substantially free from any suspended solids, is sprayed on the gas by spray nozzle 13 to scrub the sulfur dioxide from the flue gas. The scrubbed gas is discharged frown the scrubber to the atmosphere at 14, and the sulfur dioxide-containing scrubber effluent liquor is directed from the scrubber at 16 to a reactor 18. The scrubber effluent liquor is neutralized with lime or limestone in the reactor 18 under forced oxidation to produce gypsum. The reactor 18, which includes a suitable mixing apparatus 20, receives lime or limestone at 22. The forced oxidation conditions are provided by air from an air source 23. This air is compressed and pumped into the reactor 18 at 24 by a pump 26 to maintain a continuous supply of oxygen to the reactor so that any calcium sulfite in the scrubber liquor is oxidized to calcium sulfate dihydrate or gypsum. Gaseous carbon dioxide produced by the reactions occurring in the reactor 18 exits the reactor at 28. Any excess gas is directed to a carbon dioxide recovery system 30, where substantially pure usable carbon dioxide may be recovered.

Gypsum slurry from the reactor is fed through a conduit 34 to a clarifier/softener tank 36. The slurry is clarified in the clarifier 36 and clarified liquor is circulated to the scrubber 10 along line 38 to achieve additional sulfur dioxide removal. Thickened gypsum slurry leaves the clarifier 36 at 40, and is recirculated to the reactor 18. The solids are pumped through line 42 to a dewatering system 43, which can be a centrifuge, a filtering system or the like, where a relatively dry gypsum cake is produced at 44. The gypsum cake is ready for shipment to a wallboard plant or to one of the other systems (not shown) which uses the gypsum. Thickened gypsum slurry is recirculated to the reactor 18 along the path shown by arrows 48. Make up soda ash may be added to the clarifier/softener tank 36 at 50. The organic acids required to buffer the scrubbing liquor are added to the scrubber 10 at 52.

A unique feature of the present process is the ability of this process to produce gypsum and to avoid scaling in the scrubber 10 in spite of the absence of gypsum seed crystals in the scrubber. However, it is necessary to suppress either the calcium ion concentration in the clear liquor or the chloride ion concentration in the process liquor to achieve this result. The calcium ion concentration is suppressed by adding a soluble cation, such as sodium or magnesium, to the process liquor. The chloride concentration in the process liquor is reduced by injecting alkali into the flue gas ahead of the particulate control device (not shown), which is upstream of the wet scrubbers in a typical flue gas desulfurization system. The alkali absorbs the sulfur trioxide, some of the sulfur dioxide and a significant portion of the chloride in the flue gas. Suppression of the chloride concentration in the process liquor minimizes the calcium ion concentration, which reduces the relative saturation for gypsum in the scrubbers and eliminates scale formation.

The liquor stream 38 circulated to the scrubber 10 from the clarifier/softener tank 36 should contain sodium ions, but should not contain any gypsum solids or other solids. The recirculated scrubbing liquor is therefore kept clear and substantially free of solids, which minimizes abrasion and deposition of solids in the scrubbers, the mist eliminators (not shown) and other FGD system components. Suppression of the calcium ion concentration by the addition of sodium, magnesium or any other similarly behaving cation improves limestone utilization and improves crystal growth.

The FGD process of the present invention uses organic acid buffers in combination with the clear scrubbing liquor to effectively scrub sulfur oxides from flue gas while avoiding the scaling problems of available processes. Organic acid buffers have distinct advantages over the sodium sulfite buffers commonly used because they buffer at the required pH range of 4.0 to 6.0 without any tendency for off-gassing sulfur dioxide at the lower end of this pH range. Available sodium-based clear liquor FGD scrubbing processes use high concentrations of sulfite buffers, typically in the range of from 0.05 to 0.5 molar sodium sulfite, to lower the flow rate of liquor through the regeneration system. The scrubber pH has also been limited to about 5.5 to 7.0 when limestone is used as the regenerating alkali in these processes. This pH drops further in the scrubber to about 4 to 6 as sulfur dioxide is absorbed. The lower pH causes sulfur dioxide back pressure from the high sulfite concentrations, which results in poor sulfur dioxide removal efficiency. However, a higher pH is not reasonably achievable because limestone dissolution and reaction rates are suppressed. The present FGD process avoids high concentrations of sulfite by using an organic acid buffer. Preferred organic acids are formic acid, DBA (dibasic acid: usually a mixture of glutaric, succinic and adipic acids), and adipic acid. The combination of low calcium ion concentrations and low pH (about 4 to 6) favors high limestone reaction rates. Since the organic acid buffers work well at this low pH, high sulfur dioxide scrubbing efficiencies can be achieved with relatively low liquid to gas ratios.

The flue gas desulfurization process of the present invention presents additional advantages not contemplated by prior art FGD processes. Pure carbon dioxide can be recovered from the limestone reactor 18. Because this FGD process reacts the limestone in a vessel (reactor 18) that does not mix the scrubbing liquor with the flue gas, the carbon dioxide produced by the limestone reaction off-gasses from the reactor 18 at 28 as relatively concentrated carbon dioxide mixed with water vapor, oxygen and nitrogen. The cost of the process can be reduced by conducting the oxidation in a separate reactor (not shown) ahead of the limestone reactor to eliminate the dilution of the carbon dioxide with nitrogen and oxygen from the oxidation air. The carbon dioxide gas can be readily separated from the other gases by cooling and compressing the gas.

Scrubbing efficiency can be increased with the present FGD process and system because clear liquor with a low potential for scaling in the scrubber permits the use of a scrubber design with packing. This produces improved scrubber efficiency at lower liquid/gas (L/G) ratios. Moreover, the precipitation of gypsum in a reactor 18 that is separate from the scrubber system 10 keeps gypsum away from the scrubber and permits the promotion of optimum gypsum crystal growth conditions without being concerned with attrition in scrubber recirculation pumps and agitators. Optimum shear, residence time, pH and chemical concentrations can be tailored to the production of drier gypsum filter cakes without creating scrubber problems. Consequently, the costs of both the scrubber system and the production of gypsum wallboard can be greatly reduced by the present invention.

The elimination of scale from the scrubber is accomplished by keeping the relative saturation for gypsum below about 1.2 in the process liquor. Relative saturation is the product of the sulfate and calcium activities divided by their activities at equilibrium. In a clear liquor process, the relative saturation for gypsum increases as the liquor picks up sulfur dioxide in the scrubber. Some of this sulfur dioxide is naturally converted to sulfate in the scrubber. Therefore, the highest relative saturation in the process liquor occurs as the liquor drops down through the scrubber. Scaling naturally occurs in the scrubber if the increase in sulfate causes an increase in the relative saturation to around 1.2 to 1.3 or higher.

Since the pick-up of sulfur dioxide in the scrubber increases the sulfate concentration in the liquor, the minimum increase in relative saturation across the scrubber occurs when the background sulfate concentration is high so that the increase in sulfate across the scrubber is a small percentage of the total. Suppression of the calcium ion concentration by adding sodium or removing chloride allows the background sulfate concentration to increase to its maximum. This high sulfate concentration along with the fact that the liquor in the scrubber is clear and contains no limestone solids to dissolve and react in the scrubber, eliminates the formation of scale in the scrubbers and keeps the gypsum relative saturation in the range of 1.02 to 1.15 in the liquor. When the background sulfate concentration is low, as normally occurs at high calcium concentrations, a small increase in sulfate concentration can cause a high increase in relative saturation, and scaling of the scrubber internals occurs.

Another important aspect of the system design is providing enough gypsum seed crystals and residence time in the limestone reactor to insure that essentially all of the gypsum is precipitated prior to clarification of the liquor. It was found in testing that gypsum concentrations in the reactor of 10 to 20 wt. % produced the best results as shown by the lowest relative saturations for gypsum in the process liquor. Lower concentrations did not provide enough seed crystal surface area, and higher concentrations did not provide additional benefits.

Industrial Applicability

The clear liquor, organic acid buffer forced oxidation flue gas desulfurization system and process of the present invention will find their primary application in the efficient, cost-effective removal of sulfur oxides from the flue gases produced by industrial combustion processes. This flue gas desulfurization system and process will be especially useful in scrubbing flue gases produced by power-generating combustion processes where it is desired to produce a usable gypsum product at costs reduced below those of available FGD processes.

We claim:

1. A wet flue gas desulfurization process for removing sulfur oxides from flue gas to produce a usable gypsum by-product without producing scale in the process equipment, including the steps of:

(a) injecting an alkali into the flue gas upstream of the particulate removal device and the scrubber in an amount sufficient to absorb chloride from the flue gas;

(b) directing sulfur oxides-containing flue gas through a particulate removal device to remove ash and alkali chlorides and then to a scrubber;

(c) scrubbing the sulfur oxides from the flue gas with a clear scrubbing liquid that is substantially solids free and contains an organic acid buffer system capable of controlling and maintaining the pH of said process at a pH in the range of 4.5 to 6.0 to produce a sulfur-oxides free gas and a sulfur oxides-containing effluent;

(d) discharging the sulfur oxides-free gas from the process;

(e) directing the sulfur oxides-containing scrubber effluent from the scrubber to a reactor system containing lime or limestone, wherein a sufficient supply of oxidation air is constantly supplied to the reactor system to favor the production of calcium sulfate;

(f) reacting the sulfur oxides-containing scrubber effluent with the lime or limestone in the presence of oxidation air in the reaction system to form a gypsum slurry having a gypsum concentration of 10 to 20 wt. %;

(g) directing the gypsum slurry to a clarifier and clarifying a first portion of the gypsum slurry to produce a clear liquor fraction with a gypsum relative saturation of less than 1.2 and gypsum solids;

(h) dewatering the gypsum solids;

(i) thickening a second portion of the gypsum slurry from the clarifier and recirculating the thickened gypsum slurry to the reactor system;

(j) maintaining the gypsum relative saturation at less than 1.2; and (k) adding an organic acid buffer system to the clear liquor fraction to control and maintain a process pH of 4.5 to 6 and circulating the clear liquor fraction to the scrubber for use in scrubbing sulfur oxides from the flue gas.

2. The wet flue gas desulfurization process described in claim 1, wherein the organic acid buffer is selected from the group of organic acids consisting of formic acid, adipic acid and dibasic acid.

3. The wet flue gas desulfurization process described in claim 1, wherein the relative saturation for gypsum in said clear liquor is in the range of 1.02 to 1.15.

4. The wet flue gas desulfurization process of claim 1, further including the step of adding a soluble cation to the clear liquor fraction to minimize the circulating calcium ion concentration and maintain said gypsum relative saturation at less than 1.2.

5. The wet flue gas desulfurization process described in claim 4, wherein said soluble cation is sodium or magnesium.

6. The wet flue gas desulfurization process of claim 4, wherein said gypsum relative saturation is maintained in the range of 1.02 to 1.15.

* * * * *